United States Patent
Grimes et al.

(10) Patent No.: US 7,036,011 B2
(45) Date of Patent: Apr. 25, 2006

(54) DIGITAL RIGHTS MANAGEMENT

(75) Inventors: Tom Grimes, Ottawa (CA); Khanh Mai, Alpharetta, GA (US)

(73) Assignee: CacheStream Corporation, Newtown, PA (US)

( * ) Notice: Subject to any disclaimer, the term of this patent is extended or adjusted under 35 U.S.C. 154(b) by 841 days.

(21) Appl. No.: 09/893,635

(22) Filed: Jun. 29, 2001

(65) Prior Publication Data

US 2002/0002674 A1 Jan. 3, 2002

Related U.S. Application Data

(60) Provisional application No. 60/214,726, filed on Jun. 29, 2000.

(51) Int. Cl.
*H04L 9/00* (2006.01)
*G06F 11/30* (2006.01)

(52) U.S. Cl. ............. 713/156; 713/167; 713/175; 713/193

(58) Field of Classification Search ......... 713/156, 713/167, 175, 193
See application file for complete search history.

(56) References Cited

U.S. PATENT DOCUMENTS

| | | | | |
|---|---|---|---|---|
| 6,005,939 | A  * | 12/1999 | Fortenberry et al. | 705/76 |
| 6,088,797 | A  * | 7/2000 | Rosen | 713/173 |
| 6,470,086 | B1 * | 10/2002 | Smith | 380/255 |
| 6,532,542 | B1 * | 3/2003 | Thomlinson et al. | 713/187 |
| 6,611,498 | B1 * | 8/2003 | Baker et al. | 370/252 |
| 6,611,812 | B1 * | 8/2003 | Hurtado et al. | 705/26 |
| 6,615,171 | B1 * | 9/2003 | Kanevsky et al. | 704/246 |
| 6,668,325 | B1 * | 12/2003 | Collberg et al. | 713/194 |
| 6,789,189 | B1 * | 9/2004 | Wheeler et al. | 713/156 |

* cited by examiner

*Primary Examiner*—Kambiz Zand
(74) *Attorney, Agent, or Firm*—Andrews Kurth LLP

(57) ABSTRACT

A method and system for digital rights management is disclosed. The method and system utilize standalone certificates linked with hardware profiles to provide and efficient mechanism for digital rights management. A method for digital rights management includes receiving content at a client computer. The content is encrypted with an encryption key. The method further includes the client computer requesting the encryption key from a digital rights management (DRM) server using a digital certificate, the server receiving the request and the DRM server determining if the digital certificate is valid. The DRM server is remote from the client computer.

26 Claims, 12 Drawing Sheets

DIGITAL RIGHTS MANAGEMENT

CROSS REFERENCE TO RELATED APPLICATIONS

This application hereby claims the benefit of the priority of U.S. Provisional Patent Application, Ser. No. 60/214,726, filed Jun. 29, 2000, which is hereby incorporated by reference. This application also hereby incorporates by reference U.S. patent application, Ser. No. 09/835,529, entitled "Channel Dancer" and filed Apr. 17, 2001, U.S. patent application, Ser. No. 09/878,232, entitled "Personal Content Manager" and filed Jun. 12, 2000, and U.S. Patent Application entitled "Virtual Multicasting", invented by Khanh Mai, Roland Noll, Tom Grimes and Tom Dong, and filed on the same date, under separate cover, as the present application.

BACKGROUND

1. Technical Field

The present invention is related to access to secure or restricted content, and more particularly to the management of digital rights to secure or restricted rich media and multimedia content available over high bandwidth connections.

2. Description of Related Art

Over the past ten years, the bandwidth capacity available to consumers for receiving content from the Internet and other networks has increased ten-fold and more. The increased bandwidth capacity has enabled consumers to download larger and larger files and other content, including rich media and multimedia content such as audio clips, video clips, songs, programs and movies (collectively, programs or content). This increased bandwidth capacity has increased Internet usage and the potential for enjoyable and productive usage.

Often the content offered to users over the Internet or other networks is restricted or secured for any number of reasons. For example, the content may be secured since it is confidential and only intended for a certain user or users. Likewise, the content may be available only on a pay-per-view or membership basis and, therefore, is restricted to only those users that pay for the content or are members of a particular group. Further, the content may be restricted since it is copyright protected. Also, the content may be restricted by age (e.g., adult-only content) and is, therefore, restricted to users above a certain age.

Unfortunately, present systems for securing or restricting content are cumbersome and inefficient. The infrastructure to support secure distribution and provide ongoing enforcement of digital rights management is not in place. Existing systems are not flexible enough to provide an efficient system of digital rights management for a wide variety of types of content.

What is needed is a mechanism for flexibly and efficiently providing secure access of protected content to users.

SUMMARY OF THE INVENTION

An advantage of the present invention is that it overcomes the disadvantages and shortcomings of the prior art. Another advantage of the present invention is that it provides generic digital rights management that may be used in providing protection for content disseminated in most any manner. Another advantage of the present invention is that it provides conditional access to protected material on a standalone digital certificate basis.

These and other advantages of the present invention are achieved in a method for digital rights management includes receiving content at a client computer. The content is encrypted with an encryption key. The method further includes the client computer requesting the encryption key from a digital rights management (DRM) server using a digital certificate, the DRM server receiving the request and the DRM server determining if the digital certificate is valid. The DRM server is remote from the client computer.

These and other advantages of the present invention are also achieved in a system for digital rights management comprising a client computer and a DRM server. The client computer includes software comprising instructions for receiving content. The content is encrypted with an encryption key. The client computer software further comprises instructions for requesting the encryption key from a digital rights management (DRM) server using a digital certificate. The DRM server includes software comprising instructions for receiving the request and determining if the digital certificate is valid. The DRM server is remote from the client computer.

These and other advantages of the present invention are also achieved in a computer-readable medium comprising instructions for digital rights management, by receiving content at a client computer. The content is encrypted with an encryption key. The computer-readable medium further comprises instructions for requesting the encryption key from a digital rights management (DRM) server using a digital certificate. The DRM server is remote from the client computer. The DRM server receives the request. The DRM server determines if the digital certificate is valid.

These and other advantages of the present invention are also achieved in a computer-readable medium comprising instructions for digital rights management, by receiving a client computer request, at a digital rights management (DRM) server, for an encryption key using a digital certificate and determining if the digital certificate is valid. The client computer receives content that is encrypted with the encryption key.

BRIEF DESCRIPTION OF THE DRAWINGS

The detailed description will refer to the following drawings, in which like numbers and letters refer to like items, and in which.

DETAILED DESCRIPTION OF THE INVENTION

Figure 1:
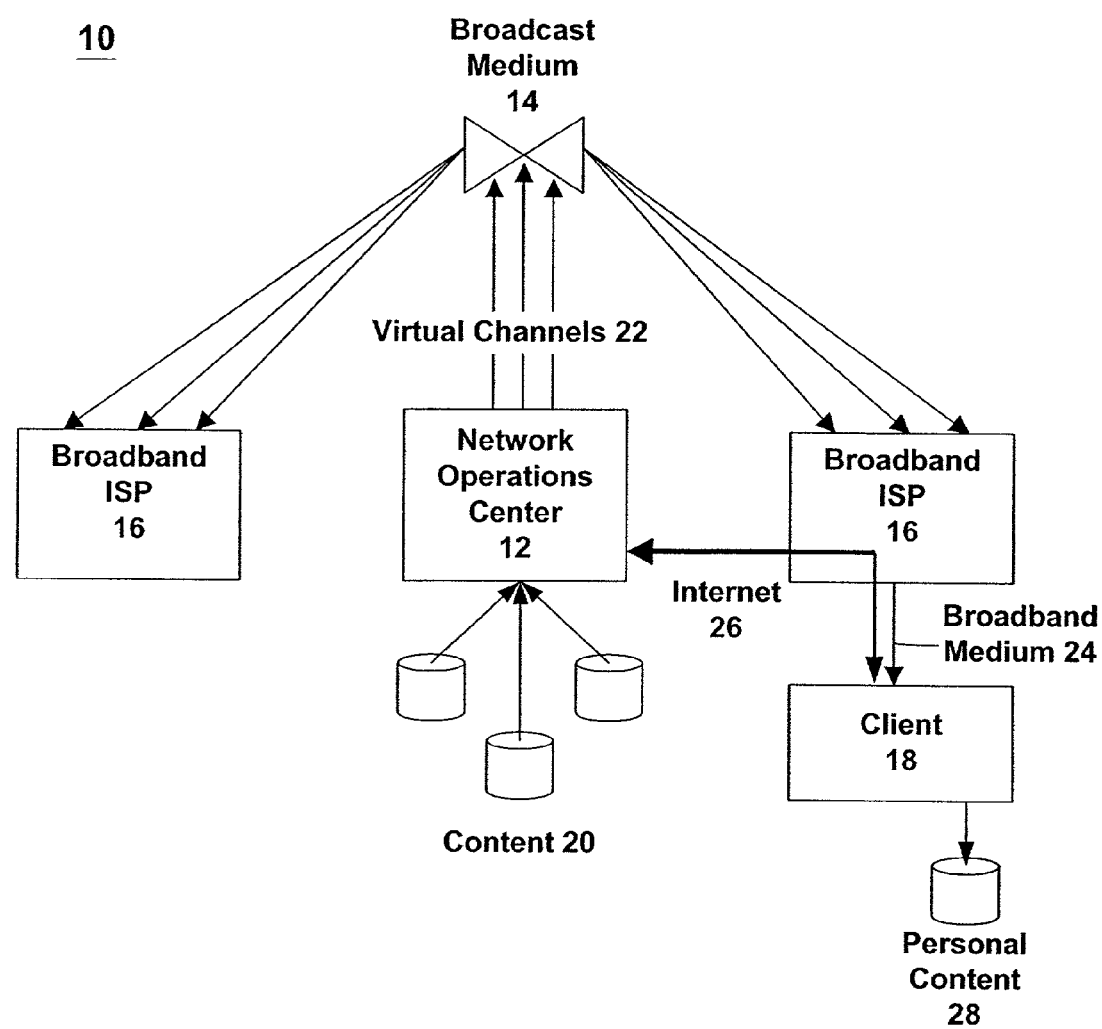
FIG. 1 is a schematic diagram illustrating an exemplary content delivery system with which the present invention may be used.

FIG. 1 illustrates a broadband content delivery system 10 with which the digital rights management system and method of the present invention may be used to regulate and control access to broadband content delivered by the system and other content (e.g., digital music or video files from websites on the Internet). The illustrative broadband content delivery system 10 comprises a signal origination point 12, a transmission medium 14 (e.g., a satellite or a landline), one or more service providers 16, and one or more clients 18. The client 18 typically includes a user machine (e.g., a PC) that includes resident client software. The client software enables access to the broadband content, supports the broadband content delivery system 10 and the digital rights management system. Indeed, the client software is part of the digital rights management system.

Typically, high bandwidth content 20 (e.g., video, audio and web data) is transmitted from a signal origination point 12 such as a Network Operations Center ("NOC") on high-resolution ("high rez") virtual channels 22. The transmission medium 14 is satellite, ether and/or landline, or a combination thereof. The content 20 is received by a service provider 16, typically an edge-of-net broadband Internet service provider ("ISP") and transmitted over a broadband medium 24, such as a digital subscriber line ("DSL") or coaxial cable, to a client 18. The broadband medium connection may be maintained or "open" continuously or substantially maintained continuously. Two-way communications between the client 18 and the NOC 12 are maintained over the Internet 26. Content may also be received by the client 18 directly from the Internet 26 via the ISP 16.

In addition to transmitting the content on virtual channels 22, the broadband content delivery system 10 also transmits a control channel (signal) that is received by the client 18. The control channel contains information and instructions that help enable the client 18 (i e., the client software) to access and control the content 20 provided by the broadband content delivery system 10. The control channel is used to issue commands or directives to the client 18. These commands or directives may result in feedback or a report back from the client 18 to the NOC 12 via the Internet. Significantly, the control channel is used to deliver program descriptors or "program nuggets", and digital messages, such as those described below (e.g., in FIGS. 5A–5D). Additionally, some commands or directives may report a failed identity or digital rights check. For example, a command or directive may report an invalid digital certificate to the client 18. Digital certificates are described in detail below.

Not necessarily all clients 18 of the broadband content delivery system 10 will have the bandwidth capability or resources to receive the high bandwidth on high rez virtual channels 22 (e.g., 512 Kbps or more). Accordingly, in addition to high bandwidth content 20, the broadband content delivery system 10 provides low bandwidth content 20 on low-resolution ("low rez") virtual channels 22 (e.g., approximately 200 Kbps) or other communications bandwidth to accommodate these clients. Consequently, when a client 18 signs-on, the broadband content delivery system 10 preferably conducts a bandwidth test to measure client's 18 bandwidth capability ("available bandwidth"). Usually, the available bandwidth is calculated as the maximum bandwidth content that the client 18 can consistently receive.

Referring back to FIG. 1, content 20 may be transmitted or broadcast by the NOC 12 on the virtual channels 22 as real-time multicast or unicast streams. A multicast stream comprises streaming content that is directed to and available to multiple clients 18 that join a multicast group. A unicast stream comprises streaming content that is directed to and available to one client 18 (at a time unicast content must be replicated for each client 18 that receives it). Furthermore, additional content 20 may be provided by third-parties as on-demand broadband content selected from the Internet ("edge-of-net") by a user at the client 18. For example, an ISP 16 may provide the edge-of-net content. Likewise, the user may store selected content, such as portions of the real-time multicast or unicast streams in a local cache at the client 18. This stored or personal content 28 may be kept on a user machine hard-drive or other storage medium.

Figure 2A:
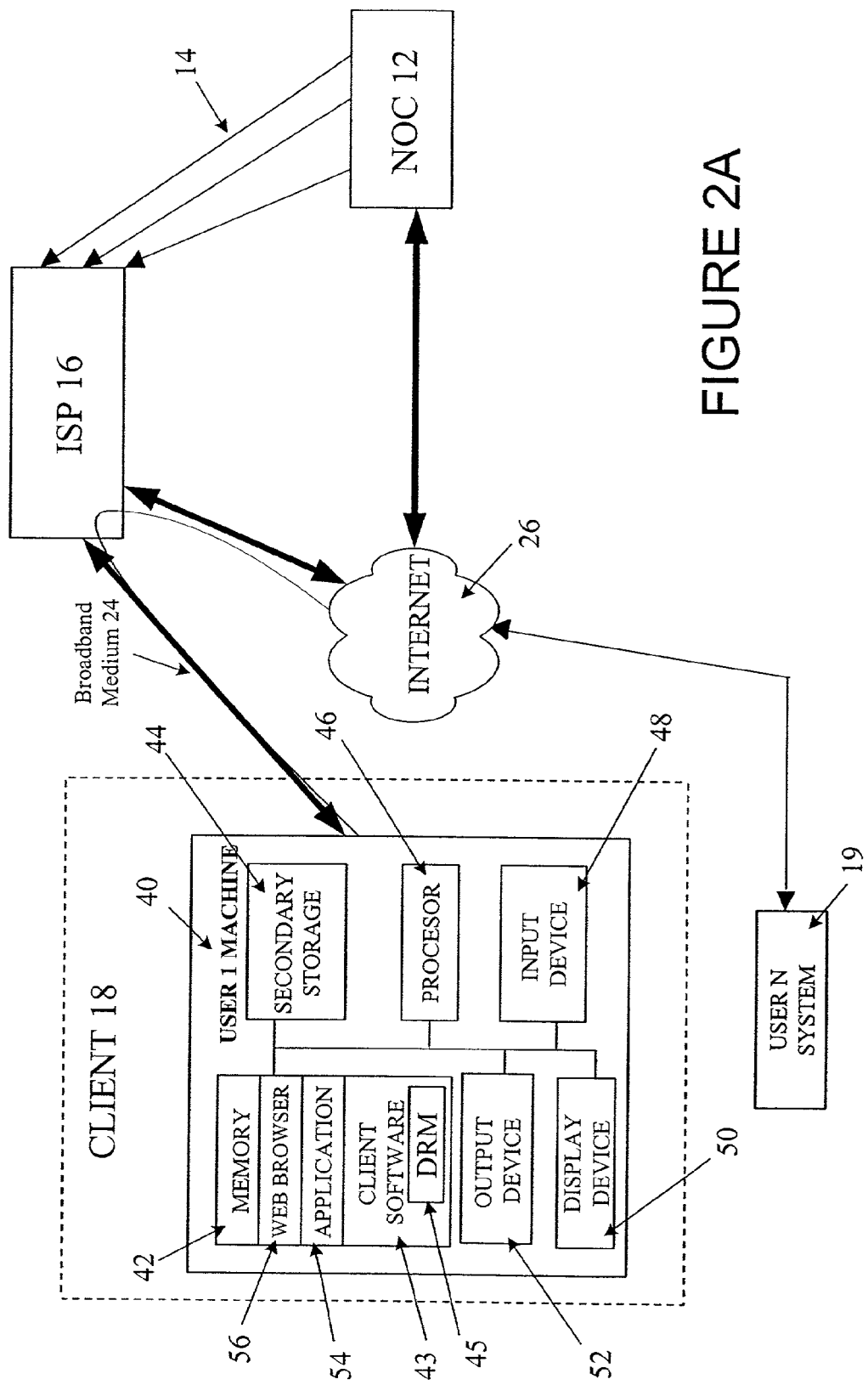
FIGS. 2A and 2B are block diagrams illustrating exemplary hardware components that support and enable the present invention.
Figure 2B:
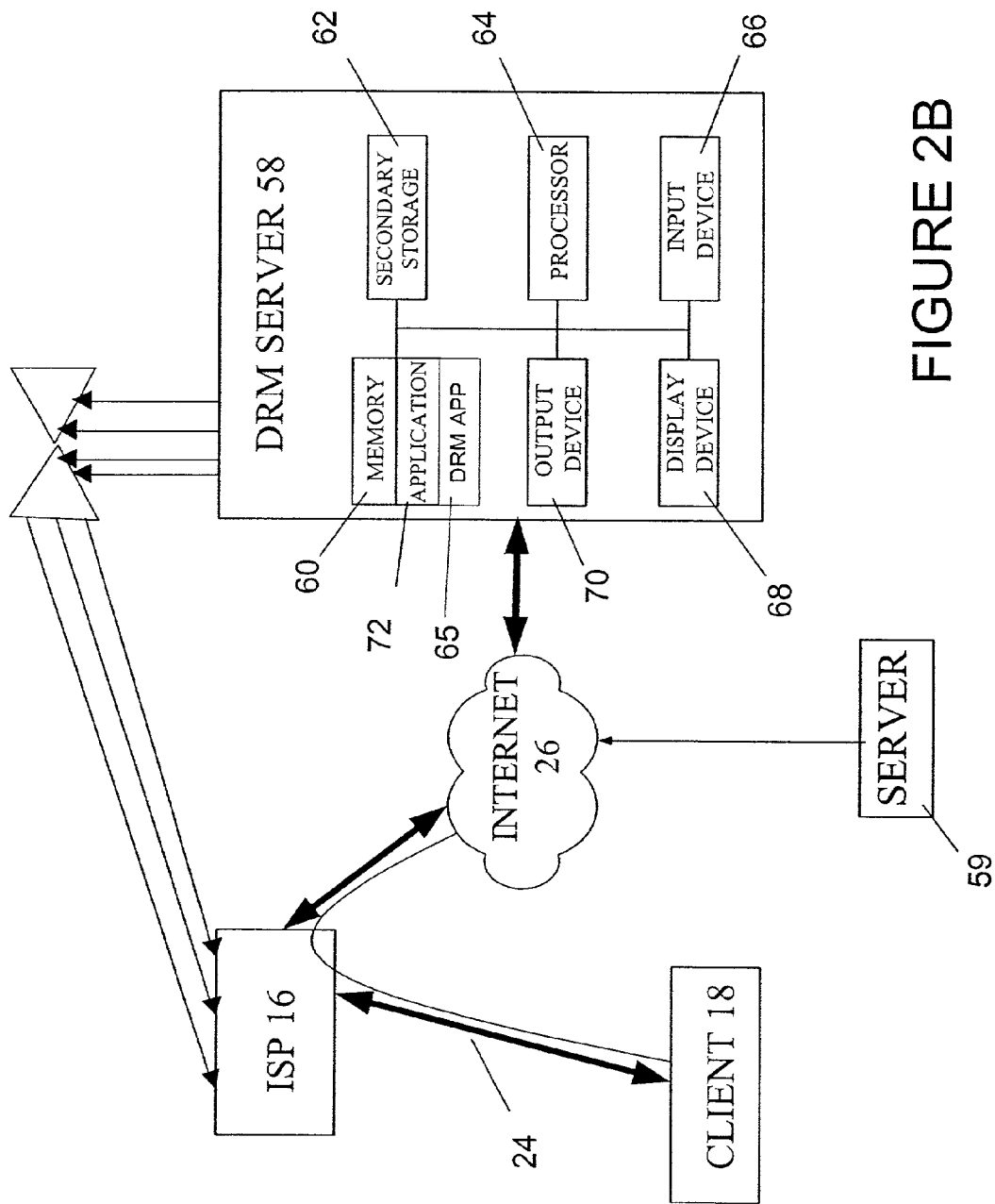

FIGS. 2A and 2B are block diagrams illustrating exemplary hardware components of the broadband content delivery system 10 that may be used for implementing the digital rights management system. FIG. 2A includes the client 18, comprising a user machine 40 connected with a network such as the Internet 26, providing network connections to the NOC 12 and the ISP 16. The user machine 40 includes the client software 43 that the user has downloaded from an ISP 16 or portal or otherwise obtained (e.g., by loading from a CD-ROM or magnetic disk or by being pre-installed on the user machine 40). As mentioned, the client software 43 supports the broadband content delivery system 10 and is executed to perform functions of the digital rights management system. Preferably, the client software 43 includes a digital rights management ("DRM") module 45 that is programmed to perform the digital rights management methods (or portions thereof) described below. Other clients 18, such as client 19 may also be connected with network and may include the same components as client 18.

The user machine 40 illustrates typical components of a user machine. The user machine 40 typically includes a memory 42, a secondary storage device 44, a processor 46, an input device 48, a display device 50, and an output device 52. Memory 42 may include random access memory (RAM) or similar types of memory, and it may store one or more applications 44, including client software 43, and a web browser 56, for execution by processor 46. The secondary storage device 44 may include a hard disk drive, floppy disk drive, CD-ROM drive, or other types of non-volatile data storage. The local cache that includes a user's personal content 28, and a user's personal profile, may be stored on the secondary storage device 44.

The processor 46 may execute client software 43 (including the DRM module 45) and other applications 44 stored in memory 42 or secondary storage 50, or received from the Internet or other network 60. The processor 46 may execute client software 43, including the DRM module 45, in order to provide the functions described in this specification including the digital rights management functions described below. The input device 48 may include any device for entering information into the user machine 40, such as a keyboard, mouse, cursor-control device, touch-screen, infrared, microphone, digital camera, video recorder or camcorder. The display device 50 may include any type of device for presenting visual information such as, for example, a computer monitor or flat-screen display. The output device 52 may include any type of device for presenting a hard copy of information, such as a printer, and other types of output devices include speakers or any device for providing information in audio form.

The web browser 56 is used to access the client software 43 and display interface screens through which the user can manage and access the broadband content broadcast by the broadband content delivery system 10. The web browser 56 also is used to access the NOC 12, the ISP 16, and third-party websites including other content (e.g., digital music and video files). Examples of web browsers 56 include the Netscape Navigator program and the Microsoft Internet Explorer program. The content broadcast on virtual channels and received by the client 18 may be displayed through the web-browser. The content may include "links", for example, HyperText Transport Protocol ("HTTP") hyperlinks to other content and/or Internet websites. Multimedia applications such as Microsoft Media Player™ and RealPlayer™ may be used to enable viewing of the real-time multicast stream. Any web browser, co-browser, or other application capable of retrieving content from a network (any wireline or wireless network may be used) and displaying pages or screens may be used.

Examples of user machines 40 for interacting within the broadband content delivery system 10 include personal computers, laptop computers, notebook computers, palm top computers, network computers, Internet appliances, or any processor-controlled device capable of executing a web browser 56 or other type of application for interacting with the broadband content delivery system 10.

The NOC 12 may comprise a plurality of servers. FIG. 2B illustrates typical hardware components of a digital rights management ("DRM") server 58 at the NOC 12. Other servers at the NOC 12, such as the channel controller, and at the ISP 16, such as a local system POP server, may have similar or the same hardware components. The DRM server 58 typically includes a memory 60, a secondary storage device 62, a processor 64, an input device 66, a display device 68, and an output device 70. The memory 60 may include RAM or similar types of memory, and it may store one or more applications 72 for execution by processor 64. The applications 72 include a digital rights management ("DRM") application 65 (or module) that is programmed to perform the digital rights management methods (or portions thereof) described below.

The secondary storage device 62 may include a hard disk drive, floppy disk drive, CD-ROM drive, or other types of non-volatile data storage. The processor 64 executes DRM application 65, and other application(s) 72, that is stored in memory 60 or secondary storage 62, or received from the Internet 26 or other network. The input device 66 may include any device for entering information into DRM server 58, such as a keyboard, mouse, cursor-control device, touch-screen, infrared, microphone, digital camera, video recorder or camcorder. The display device 68 may include any type of device for presenting visual information such as, for example, a computer monitor or flatscreen display. The output device 70 may include any type of device for presenting a hard copy of information, such as a printer, and other types of output devices include speakers or any device for providing information in audio form.

The DRM server 58 may store a database structure in secondary storage 74, for example, for storing and maintaining information regarding the broadband content delivery system 10 and the clients 18. For example, it may maintain a relational, object-oriented, or other DRM database for storing DRM information such as digital certificates with private keys and linked hardware profiles (see below).

As mentioned above, processor 46 and/or processor 64 may execute one or more software applications 44 or 72, such as DRM module 45 and DRM application 65, in order to provide the digital rights management system and methods, and other functions described in this specification. The processing may be implemented in software, such as software modules, for execution by computers or other machines. Preferably, the DRM module 45 is a module or component of the client software 43.

The processing by processor 46 and/or processor 64 may provide and support pages, windows and menus (collectively, "screens ") described in this specification and otherwise for display on display devices associated with the client 18. The term "screen" refers to any visual element or combinations of visual elements for displaying information or forms; examples include, but are not limited to, graphical user interfaces on a display device or information displayed in web pages or in pop-up windows/menus on a display device. The screens may be formatted, for example, as web pages in HyperText Markup Language (HTML), Extensible Markup Language (XML) or in any other suitable form for presentation on a display device depending upon applications used by users to interact with the broadband content delivery system 10.

Although only one DRM server 58 is shown, broadband content delivery system 10 may use multiple servers 59 as necessary or desired to support the users and may also use back-up or redundant servers to prevent network downtime in the event of a failure of a particular server. In addition, although the user machine 40 and DRM server 58 are depicted with various components, one skilled in the art will appreciate that the user machine 40 and the DRM server 58 can contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling a computer system, such as user machine 40 and DRM server 58, to perform a particular method or implementation, such as those described below.

Figure 3A:
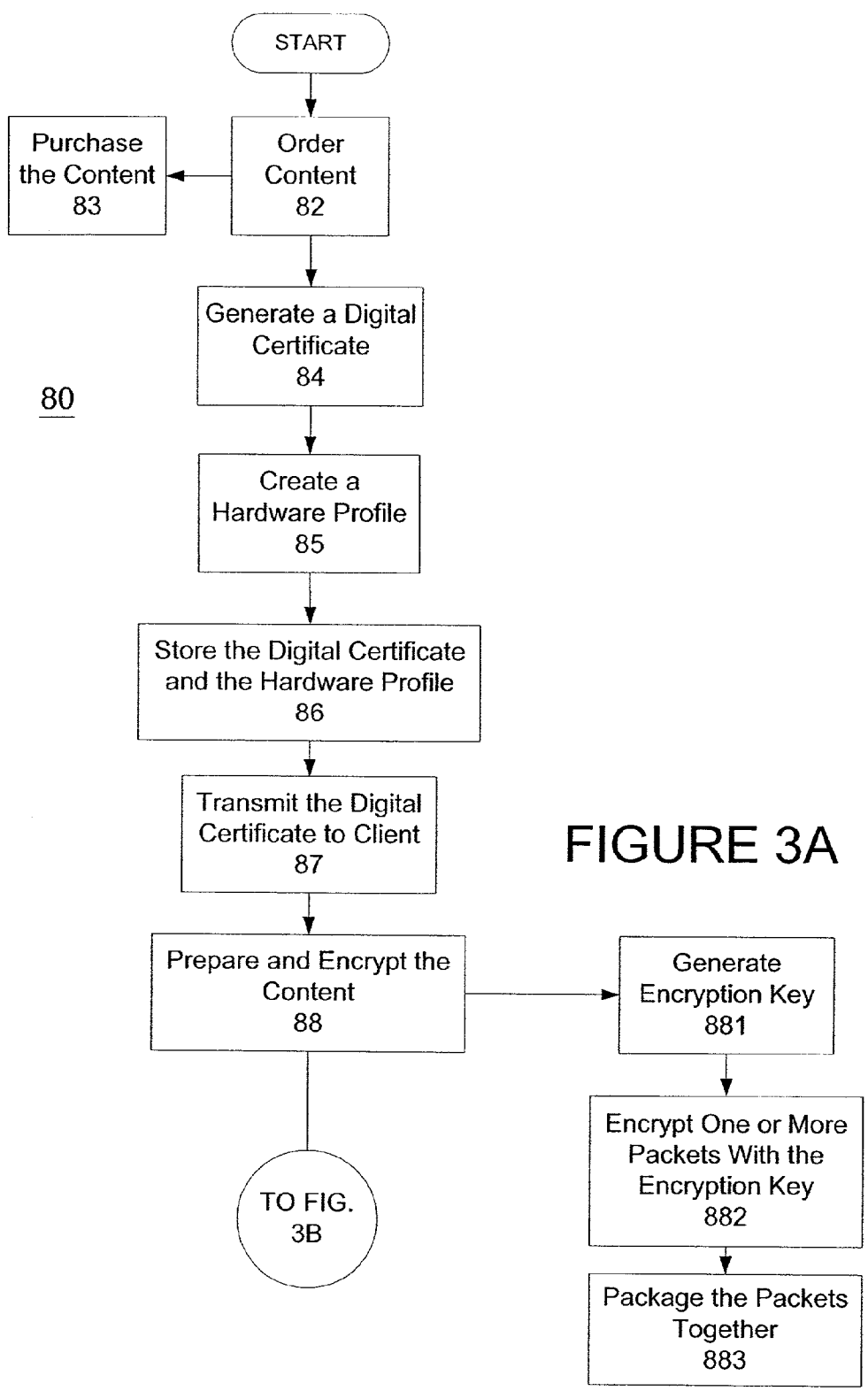
FIGS. 3A–3B are flowcharts illustrating an exemplary method of digital rights management.
Figure 3B:
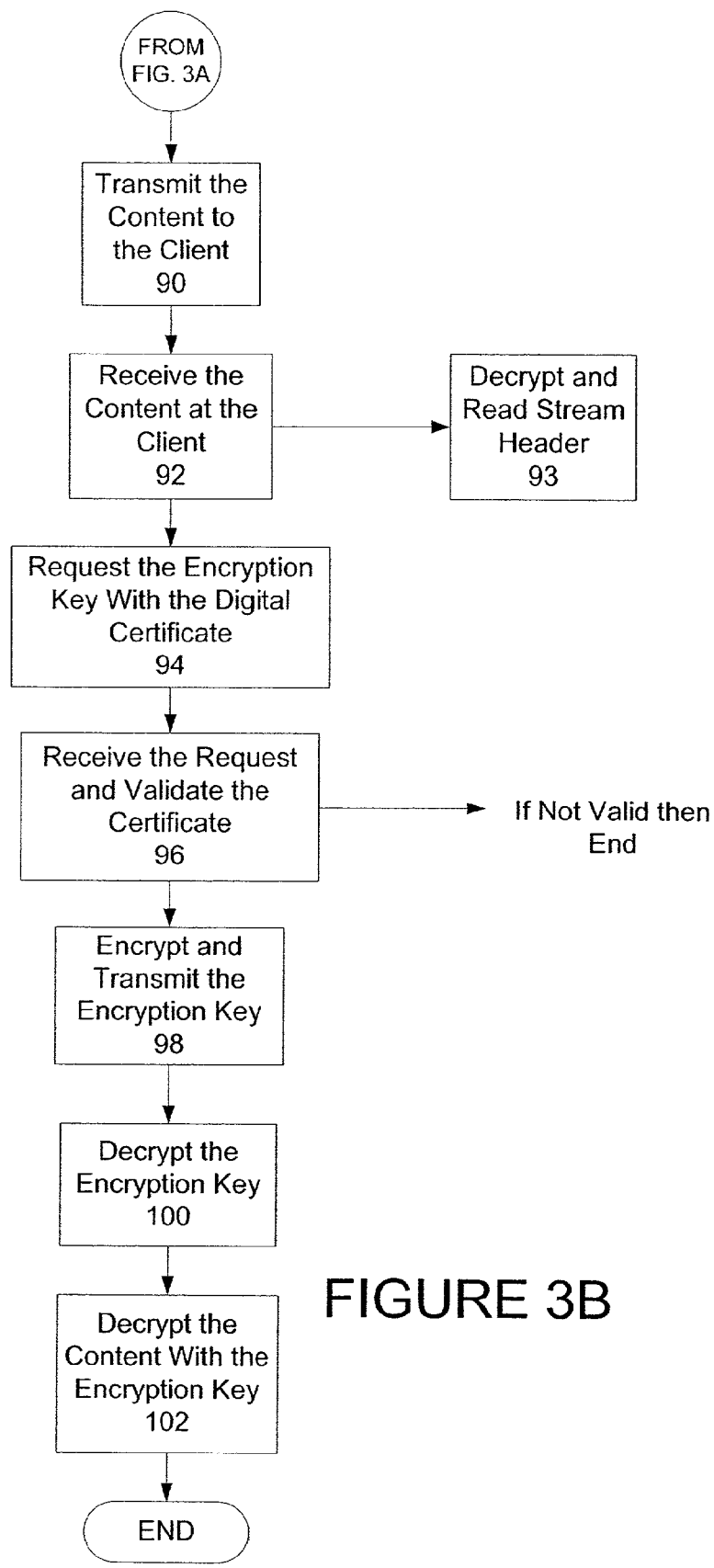

FIGS. 3A–3B are flowcharts illustrating a method 80 of digital rights management according to the present invention. Method 80 may be implemented, for example, with software modules for execution by processor 46, processor 64, or a combination of the two processors. As shown, the method 80 preferably comprises the steps of: ordering content 82, which may include purchasing the content 83; generating a digital certificate 84; creating a hardware profile 85; storing the certificate and hardware profile 86; transmitting the certificate to client 87; preparing and encrypting the content 88; transmitting the content to the client 90; receiving the content at the client 92, which may include decrypting and reading a stream header 93; requesting an encryption key using digital certificate 94; receiving the encryption key request and validating the digital certificate 96; encrypting and transmitting the encryption key 98; decrypting the encryption key 100; and, decrypting the content with the encryption key 102.

Ordering content 82 comprises a user at the client 18 ordering content, that is transmitted via a virtual channel 22, from the NOC 12. The content may be ordered from the NOC 12 via the Internet 26 using an interface screen displayed on the web browser 56. The interface screen may be, for example, any of the interface screens shown in related application Personal Content Management, Ser. No. 09/878,232, filed Jun. 12, 2001, which is hereby incorporated by reference. Alternatively, ordering content 82 comprises a user at the client 18 ordering content from a third-party content provider, such as a from a third-party website accessible through the Internet 26.

As noted above, ordering content 82 may include purchasing the content 83. Purchasing the content 83 comprises, for example, the user purchasing pay-per-view ("PPV")

content or a subscription to content through, for example, a secure sockets layer ("SSL") transaction with the DRM server 58 (or other NOC 12 component) or with a third-party website server. The user may pay for the content using known methods, such as with a credit card payment or a submission of credits previously purchased or earned by the user. If the content is restricted content, e.g., content restricted by age, ordering content 82 may also include the user submitting proof that the user meets the restriction (e.g., that the user is above the age limit).

If the ordered content is PPV content or subscription content, or is otherwise restricted content, a digital certificate may be generated for the content and the content may be encrypted so that only clients 18 that receive the digital certificate can access the content. Consequently, only those clients 18 that purchased the PPV content or the subscription, or that meet the restriction, will receive the digital certificate. When a user successfully purchases PPV content or subscription content, or otherwise restricted content is broadcast, the DRM server 58 or other server at the NOC 12 creates an encrypted digital certificate and transmits it, via the control channel, the Internet 26, or some other communication medium, to the client 18. For example, the process of ordering content 82 may include an interactive session between the client 18 and the DRM server 58 in which the DRM application 65 creates the digital certificate and transmits it to the client 18 in advance of broadcast of the PPV content, subscription content, or otherwise restricted content.

Therefore, referring to FIG. 3A, generating a digital certificate 84 preferably comprises the DRM application 65 creating a unique standard public key infrastructure ("PKI") key pair (ie., corresponding public and private keys), creating a digital certificate that includes a program ID that identifies the ordered content, the public key of the PKI key pair and a digital certificate serial number, and creating a corresponding digital certificate that includes the private key of the PKI key pair and the digital certificate serial number, using methods known to one of ordinary skill in the art. Alternatively, generating a digital certificate 84 may be performed by the third-party website server (e.g., when the user orders content from a third-party website). If the third-party website server generates the digital certificate, the digital certificate with the public key is transmitted to the client 18 and the digital certificate with the private key is transmitted to the DRM server 58. The digital certificate serial number is used to identify and locate the digital certificate, as explained below. The digital certificate preferably also includes associated business rules, such as a certificate expiration date, that are used as part of the certificate validation process.

A hardware profile (or pc profile) that identifies the hardware components of the client 18 that ordered the content is preferably linked to and stored with the digital certificate with the private key in the DRM database. The hardware profile is preferably a proprietary representation of the user machine 40 based on hardware related constants. The hardware profile may include, for example, a serial number of the user machine 40, a description of the processor 46 (e.g., a Pentium III processor), components of the user machine 40 (e.g., amount/type of memory, amount/type of secondary storage, etc.), the type of user machine 40 (e.g, a Dell® laptop, a Palm Pilot®, etc.), or a combination of this and/or other information that may be automatically retrieved, using methods known to one of ordinary skill in the art, from the user machine 40 of the client 18 that ordered the content. Therefore, generating a hardware profile 85 preferably comprises DRM application 65 retrieving such hardware profile information from the user machine 40 of the client 18 that ordered the content and creating a hardware profile file that includes the hardware profile information. The DRM application 65 may determine the hardware profile information in the background during the interactive content ordering session between the client 18 and the DRM server 58. Alternatively, the user may be prompted to manually enter or confirm the hardware profile information. The generating step 85 alternatively may be performed during installation of the client software 43. The hardware profile generally remains constant throughout the life of the user machine 40. The hardware profile is preferably a unique characteristic or set of characteristics (i.e., digital DNA) of the user machine 40.

Storing the certificate and the hardware profile 86 preferably comprises the DRM application 65 storing the digital certificate with the private key and the hardware profile (of the client 18 that ordered the content) in the DRM database maintained by the DRM server 58. The hardware profile of the client 18 is linked with the digital certificate. Transmitting the certificate 87 preferably comprises the DRM application 65 transmitting the digital certificate with the public key to the client 18 that ordered the content. The digital certificate may be transmitted 87 during the interactive content ordering session between the client 18 and the DRM server 58. If the digital certificate is generated by a third-party website server, the digital certificate is transmitted 87 by the third-party website server to the client 18 (and to the DRM server 58). The digital certificate is preferably stored in the secondary storage device 44 of the client 18.

Figure 4:
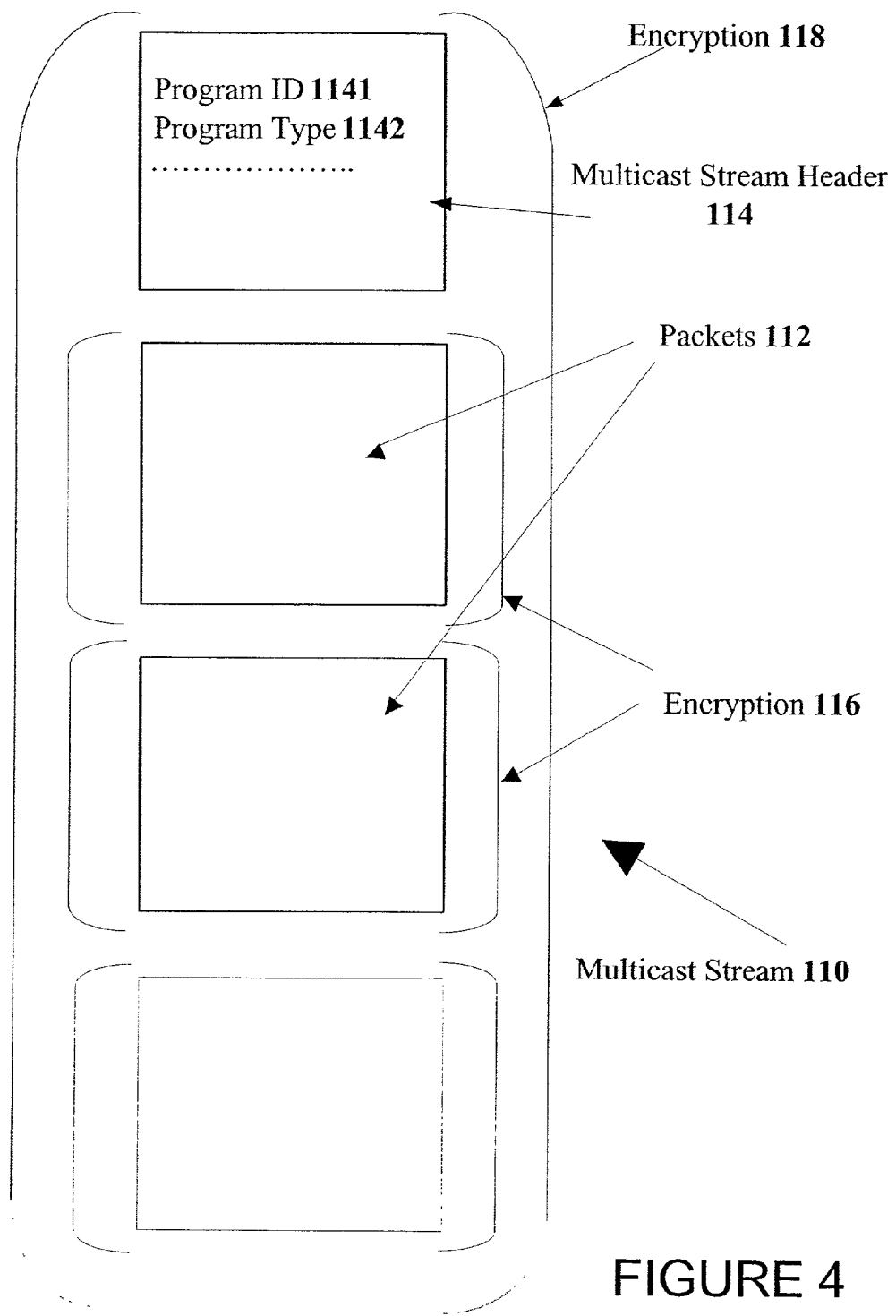
FIG. 4 is a block diagram illustrating an exemplary stream of content.

A portion of the digital rights management takes place during the preparation and broadcast of content as a real-time multicast (or unicast) stream on a virtual channel 22. The real-time streams on the virtual channels 22 preferably include a plurality of digital data packets. Each piece of content (e.g., a program, digital music file, digital video file) preferably comprises a plurality of related digital data packets. One of the related digital data packets is a multicast (or unicast) stream header, as illustrated in FIG. 4. The multicast stream header preferably includes a program ID and a program type. The program ID identifies the particular piece of content. The program type indicates further information about the program such as whether the particular piece of content is pay-per-view, pay-per-download or subscription ("PPV") content or otherwise restricted (e.g., R-rated, adult only, parental controlled, certain employees only, etc.) content. The digital certificate issued for the particular piece of content preferably includes a program ID that matches the program ID with stream header.

Referring back to FIG. 3A, preparing and encrypting the content 88 preferably comprises generating a symmetric encryption key 881, encrypting one or more of the related digital data packets with the symmetric encryption key 882, and packaging the related digital data packets together 883. Generating a symmetric encryption key preferably comprises the DRM application 65 generating a symmetric encryption key for the content in a manner known to one of ordinary skill in the art, storing and linking the symmetric encryption key with the digital certificate of the content in the DRM database, and transmitting the symmetric encryption key to a channel controller. Channel controllers are used to produce the virtual channels 22 on which the streams are broadcast, as described in related U.S. patent application, Ser. No. 09/835,529, filed Apr. 17, 2001, hereby incorporated by reference. Alternatively, the symmetric key may be generated by the third-party website server and transmitted to the DRM server 58 for storage and linkage with the digital certificate of the content in the DRM database, if the content originates from the third-party website. Encrypting one or more of the related digital data packets with the symmetric encryption key 882 preferably comprises the channel controller encrypting one or more of the digital data packets of the content with the symmetric encryption key in a manner known to one of ordinary skill in the art. Alternatively, the encrypting step 882 may be performed by the third-party website server, if the content originates from the third-party website.

Packaging the related digital data packets together 883 preferably comprises the channel controller encrypting the related digital data packets with a static application key. The static application key is preferably maintained at the NOC 12 and the client 18. This encryption is a second, optional encryption. This and the above encryption are generally less than 128-bit encryption, so that the client 18 processor 46 can decrypt the packets fast enough to keep up with the high data rates of the real-time stream. Generally, the more bits used in the encryption, the more processing is required to decrypt the packets. With faster client 18 processors 46, greater-bit encryption may be used.

Referring to FIG. 3B, transmitting the content 90 preferably comprises the NOC 12 broadcasting the content as a real-time stream on a virtual channel 22. Alternatively, the third-party website server may transmit the content 90 via the Internet 26. Receiving the content 92 preferably comprises the client 18 receiving the real-time stream (i.e., the packaged related digital data packets). After initial receipt of the real-time stream, the client 18 de-crypts the multicast stream header. Decrypting and reading a stream header 93 preferably comprises the client software 43 decrypting the packaged content with the static encryption key and reading the multicast stream header to determine if the program type indicates that the particular piece of content is PPV, subscription or otherwise restricted viewing.

Figure 5A:
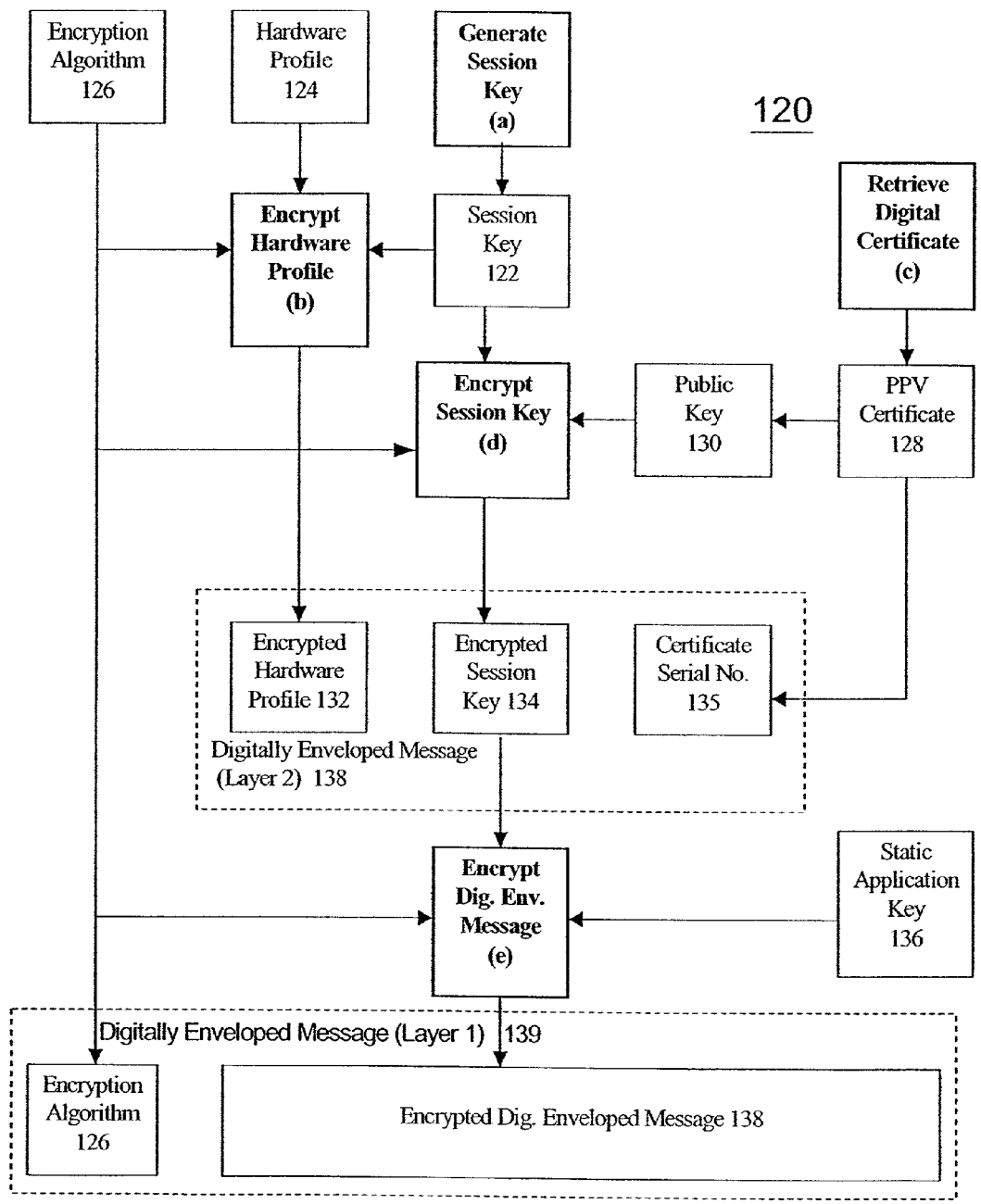
FIGS. 5A to 5D are flow-block diagrams illustrating an exemplary method of digital rights management.

Referring to FIG. 3B, if the piece of content is PPV, subscription or otherwise restricted viewing, the client 18 (e.g., the DRM module 45) preferably requests the symmetric encryption key using the digital certificate 94. FIG. 5A illustrates an exemplary method of the client 18 requesting the symmetric encryption key using the digital certificate. When the client 18 requests the symmetric encryption key, the DRM server 58 (e.g., the DRM application 65) receives the request and validates the digital certificate 96, which is exemplarily illustrated in FIG. 5B and described in detail below. If the request is validated, the DRM server 58 (e.g., the DRM application 65) encrypts and transmits the symmetric encryption key 98, as exemplarily illustrated in FIG. 5C and described in detail below. Upon receipt, the client 18 decrypts the symmetric encryption key 100, as exemplarily illustrated in FIG. 5D and described in detail below. In a manner known to one of ordinary skill in the art, the DRM module 45 decrypts the content 102 (i.e., the related digital data packets) with the symmetric encryption key. Once the content is decrypted 102, the content may be displayed on the display device 50, played on a speaker or other audio output device of the user machine 40, or otherwise output by the client 18.

FIG. 4 illustrates the first few related digital data packets 112 of a piece of content in a multicast stream 110 (may be a unicast stream). One of the digital data packets 112 is the multicast (or unicast) stream header 114. As discussed above, the multicast stream header 114 preferably includes the program ID 1141 and program type 1142. The related digital data packets 112 are shown with a first layer of symmetric key encryption 116 and an outer layer of static application key encryption 118, with reference to step 88 in FIG. 3A above. As shown, the static application key encryption 118 preferably encrypts all of the related digital data packets 112, including the multicast stream header 114. Likewise, the symmetric key encryption 116 preferably encrypts a subset of the related digital data packets 112, excluding the multicast stream header 114.

As discussed above, FIG. 5A is a function-block diagram that illustrates an exemplary method 120 of the client 18 requesting the symmetric encryption key of received content, corresponding to step 94 of the method 80 shown in FIG. 3B. Steps of the method 120 are represented by reference letters while various components, files, keys, etc. utilized or effected by the method 120 are represented by reference numbers. As shown in FIG. 5A, the method 120 comprises the DRM module 45 (not shown in FIG. 5A) (a) randomly generating a session key 122. The DRM module 45 (b) encrypts the hardware profile 124 of the client 18 with the session key 122 using a standard encryption algorithm 126. Using the program ID from the multicast stream header 114 of the received content, the DRM module 45 (c) retrieves the corresponding digital certificate 128 for the received content from a digital certificate store on the client 18 (e.g., in the secondary storage device 44) by searching the digital certificate store for a digital certificate with a program ID matching the program ID from the multicast stream header 114. In the example shown in FIG. 5A, the content is PPV content so the digital certificate 128 for the received content is a PPV certificate. The digital certificate 128 is preferably retrieved (c) from the secondary storage device 44 of the client 18.

As discussed above, the digital certificate 128 transmitted and received by the client 18 includes the public key 130 of the PKI key pair generated by the DRM application 65 (e.g., step 84 of FIG. 3). The method 120 further comprises the DRM module 45 (d) encrypting the session key with the public key 130 using the standard encryption algorithm 126. The DRM module 45 digitally envelopes (step not shown) the encrypted hardware profile 132, the encrypted session key 134, and the digital certificate serial number 1143 together as a second layer digitally enveloped message 138. The DRM module 45 (e) encrypts the digitally enveloped message 138 with the static application key 136 using the standard encryption algorithm 126. The DRM module 45 preferably digitally envelopes (step not shown) the encrypted digitally enveloped message 138 and the standard encryption algorithm 126 together as a first layer digitally enveloped message 139 and transmits (not shown) the first layer digitally enveloped message 139 to the NOC 12 (via the Internet 26 or other connection).

Figure 5B:
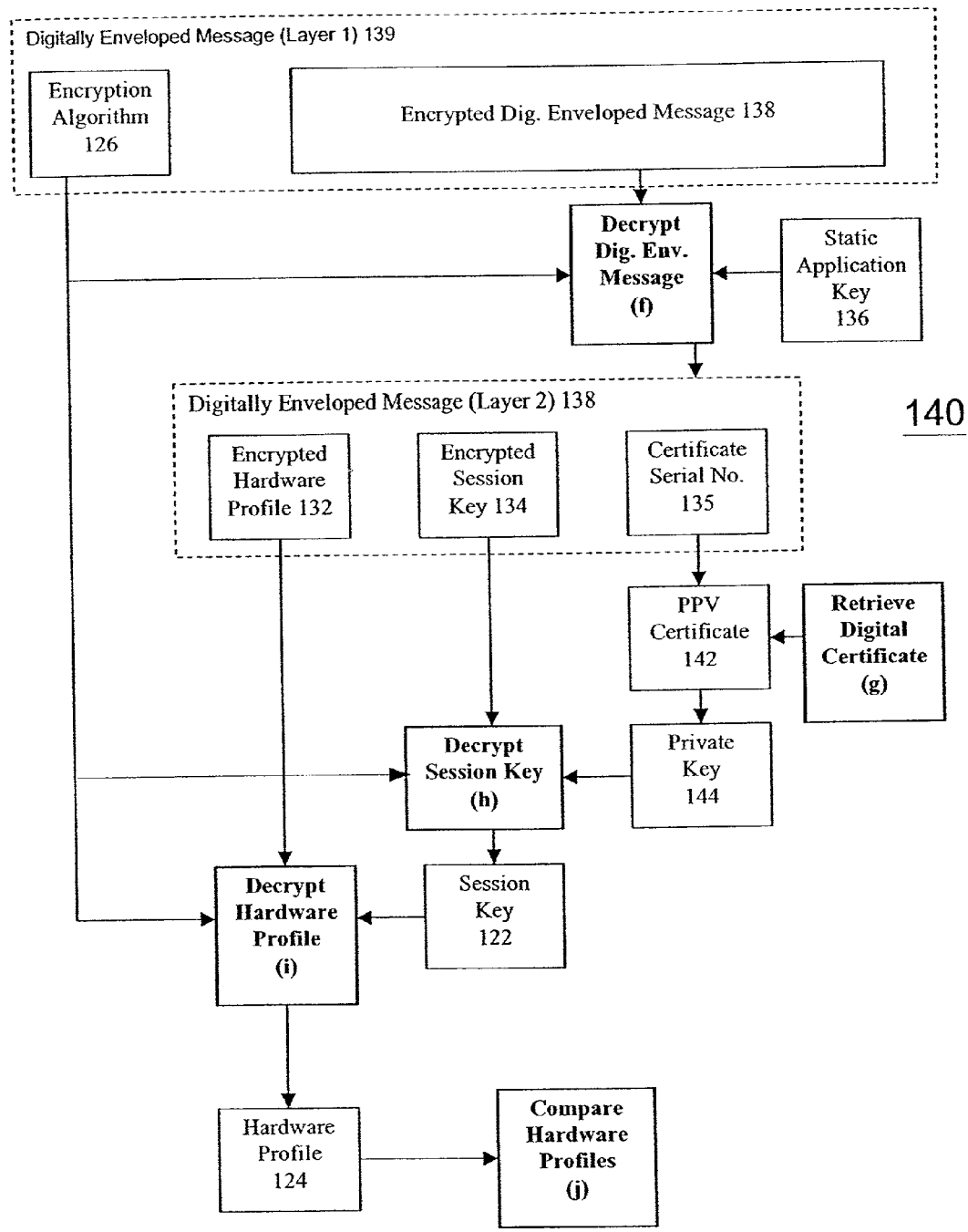

FIG. 5B is a function-block diagram that illustrates an exemplary method 140 of the NOC 12 receiving and validating the client 18 request, corresponding to step 96 of the method 80 shown in FIG. 3. As above, steps of the method 140 are represented by reference letters while various components utilized or effected by the method 140 are represented by reference numbers. The method 140 comprises the DRM application 65 (f) decrypting the encrypted digitally enveloped message 138 with the static application key 136 using the standard encryption algorithm 126. Using the digital certificate serial number 135 contained in the digitally enveloped message 138, the DRM application 65 (g) retrieves the corresponding digital certificate 142 from the DRM database. As discussed above, the digital certificate 142 is preferably the same as the digital certificate 126 stored at the client 18 except that the digital certificate 142 includes the private key 144 of the PKI key pair.

Figure 5C:
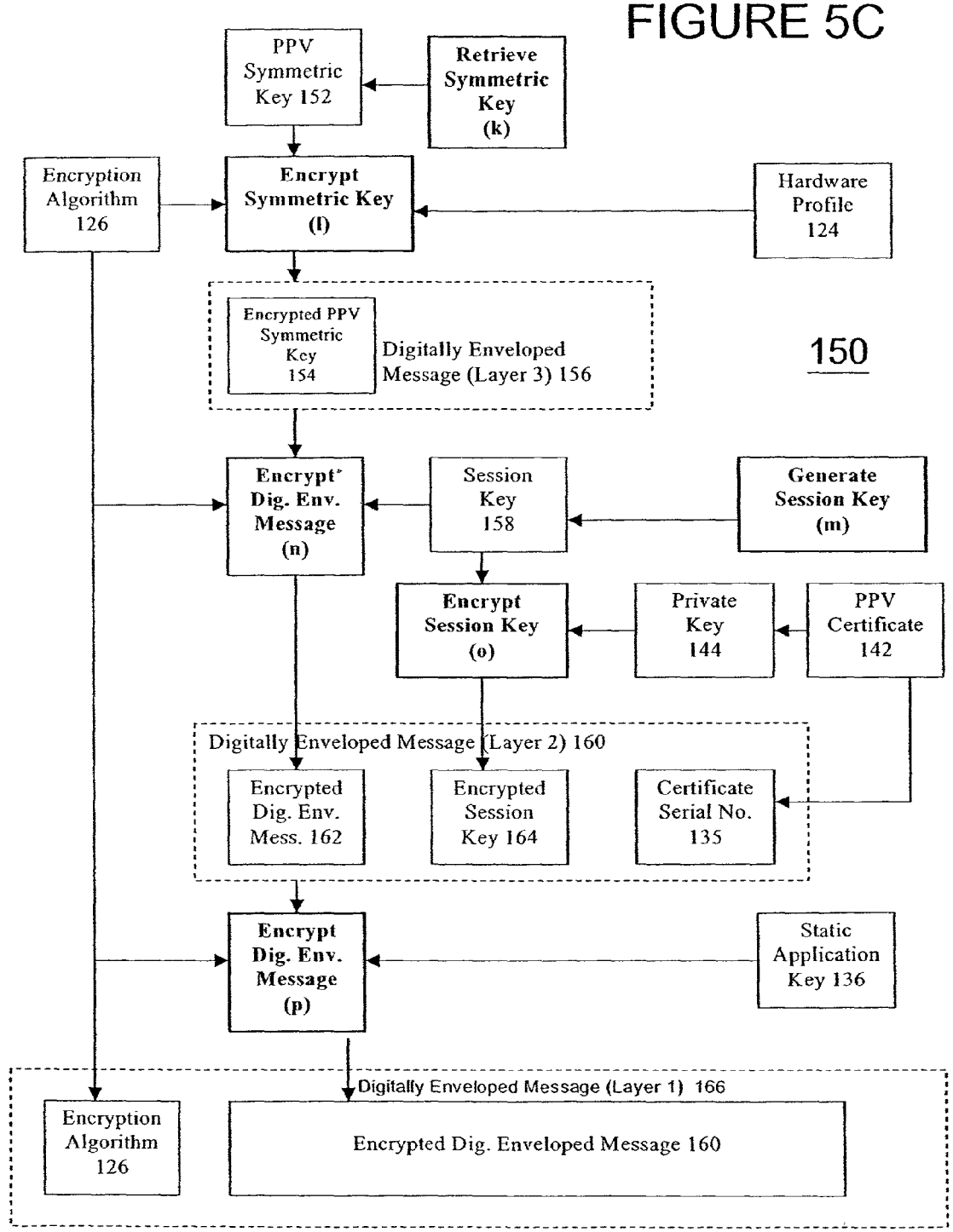

Accordingly, the method 140 further comprises the DRM application 65 (h) decrypting the encrypted session key 134 with the private key 144 using the standard encryption algorithm 126. The DRM application 65 decrypts (i) the encrypted hardware profile 132 with the session key 122 using the standard encryption algorithm 126. The DRM application 65 then compares (j) the hardware profile 124 with the hardware profile (not shown) linked to the digital certificate 142 in the DRM database. If the hardware profiles match, and the associated business rules are satisfied (e.g., the digital certificate is not expired), the digital certificate is validated and the method shown in FIG. 5C is performed. If the hardware profiles do not match or the associated business rules are not satisfied (e.g., the digital certificate is expired), a "validation refused" message, or similar message, is returned to the client 18 (e.g., via a control channel) and the process ends.

FIG. 5C is a function-block diagram that illustrates an exemplary method 150 of the NOC 12 encrypting and transmitting the symmetric encryption key, corresponding to step 98 of the method 80 shown in FIG. 3. As above, steps of the method 150 are represented by reference letters while various components utilized or effected by the method 150 are represented by reference numbers. The method 150 comprises the DRM application 65 (k) retrieving the symmetric encryption key 152 linked to the digital certificate 142 in the DRM database and encrypting the symmetric encryption key 152 with hardware profile 126 using the standard encryption algorithm 126. The encrypted symmetric encryption key 154 is preferably digitally enveloped (step not shown) as a third layer digitally enveloped message 156.

The method 150 further comprises the DRM application 65 (m) randomly generating a session key 158 and (n) encrypting the digitally enveloped message 156 with the session key 158 using the standard encryption algorithm 126. The DRM application 65 (o) encrypts the session key 158 with the private key 144 using the standard encryption algorithm 126 and digital envelopes (not shown) the encrypted digitally enveloped message 162, the encrypted session key 164 and the digital certificate serial number 135 in a second layer digitally enveloped message 160. The DRM application 65 (p) encrypts the digitally enveloped message 160 with the static application key 136 using the standard encryption algorithm 126. The encrypted digitally enveloped message 160 and the standard encryption algorithm 126 are preferably enveloped (not shown) as a first layer digitally enveloped message 166 and transmitted (not shown) to the client 18.

Figure 5D:
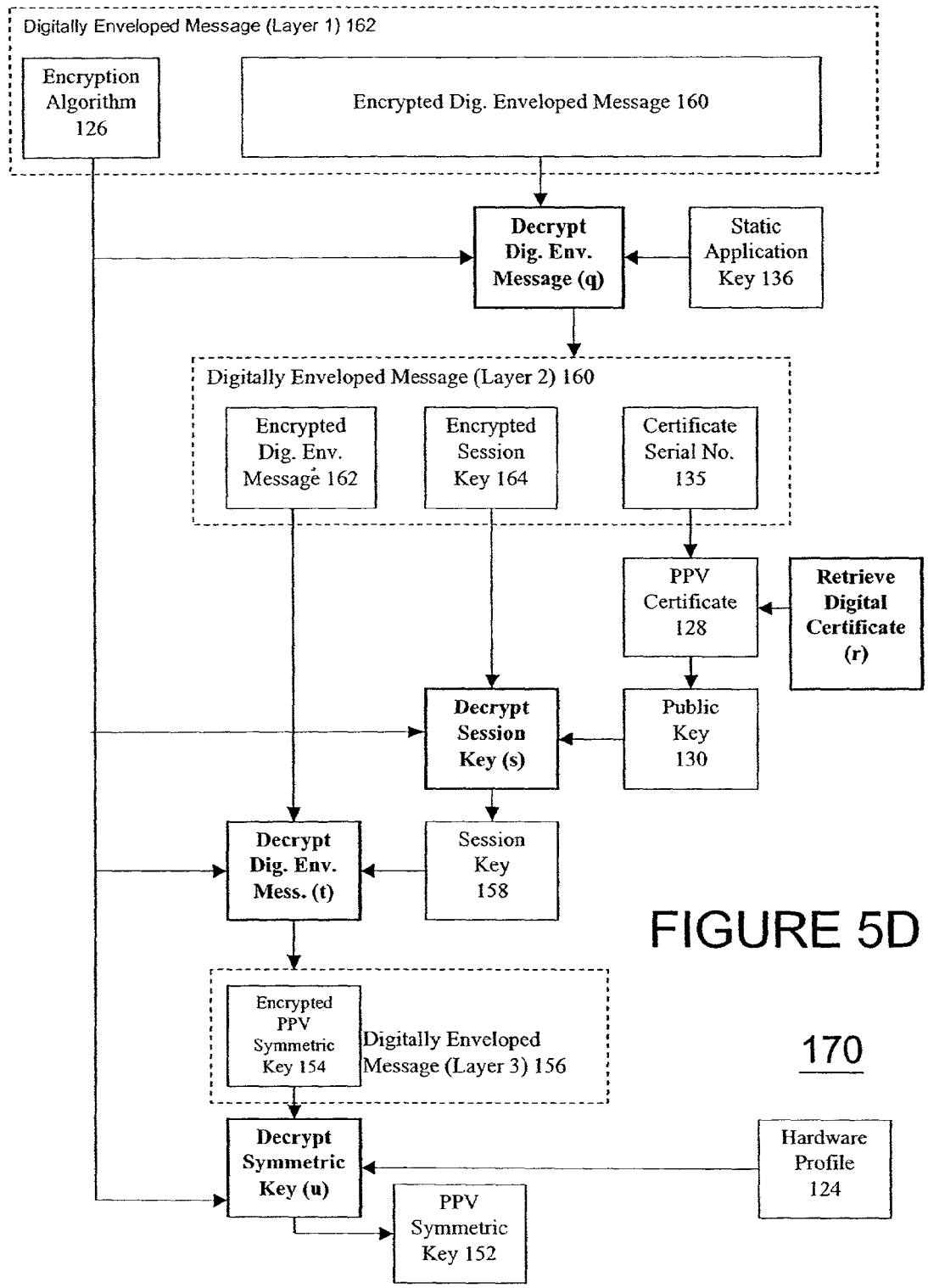

FIG. 5D is a function-block diagram that illustrates an exemplary method 170 of the client 18 receiving and decrypting the symmetric encryption key, corresponding to step 100 of the method 80 shown in FIG. 3. As above, steps of the method 170 are represented by reference letters while various components utilized or effected by the method 170 are represented by reference numbers. The method 170 comprises the preferably DRM module 45 (q) decrypting the encrypted digitally enveloped message 160 with the static application key 136 using the standard encryption algorithm 126. Using the digital certificate serial number 135 from the digitally enveloped message 160, the DRM module 45 (r) retrieves the corresponding digital certificate 128 for the received content and (s) decrypts the encrypted session key 164 with the public key 130 using the standard encryption algorithm 126. The DRM module 45 (t) decrypts the encrypted digitally enveloped message 162 with the session key 158 using the standard encryption algorithm 126. The DRM module 45 (u) decrypts the encrypted symmetric encryption key 154 with the hardware profile 124 using the standard encryption algorithm 126. The symmetric encryption key 152 may then be used to decrypt the content (e.g., the symmetric key encryption 116 of the subset of the related digital data packets 112), as in step 102 of the method 80 illustrated in FIG. 3.

The NOC 12 explicitly enables recording of content. Generally, if the NOC 12 does not enable recording for a particular piece of content, a client 18 will not record the content. The NOC 12 may enable the recording of a piece of content by including an indication of such in the stream header 114. If recorded content has a corresponding digital certificate (the recorded content is PPV content, subscription content or otherwise restricted content), access to the content may be determined as shown above in FIGS. 5A to 5D. In other words, the recorded content may be encrypted with a symmetric encryption key 152 that must be requested as shown in FIG. 5A. If the digital certificate is expired or the business rules associated with the digital certificate otherwise indicate that the digital certificate is invalid (e.g., content was not permitted to be recorded) the request is invalidated and the recorded content cannot be accessed.

Figure 6A:
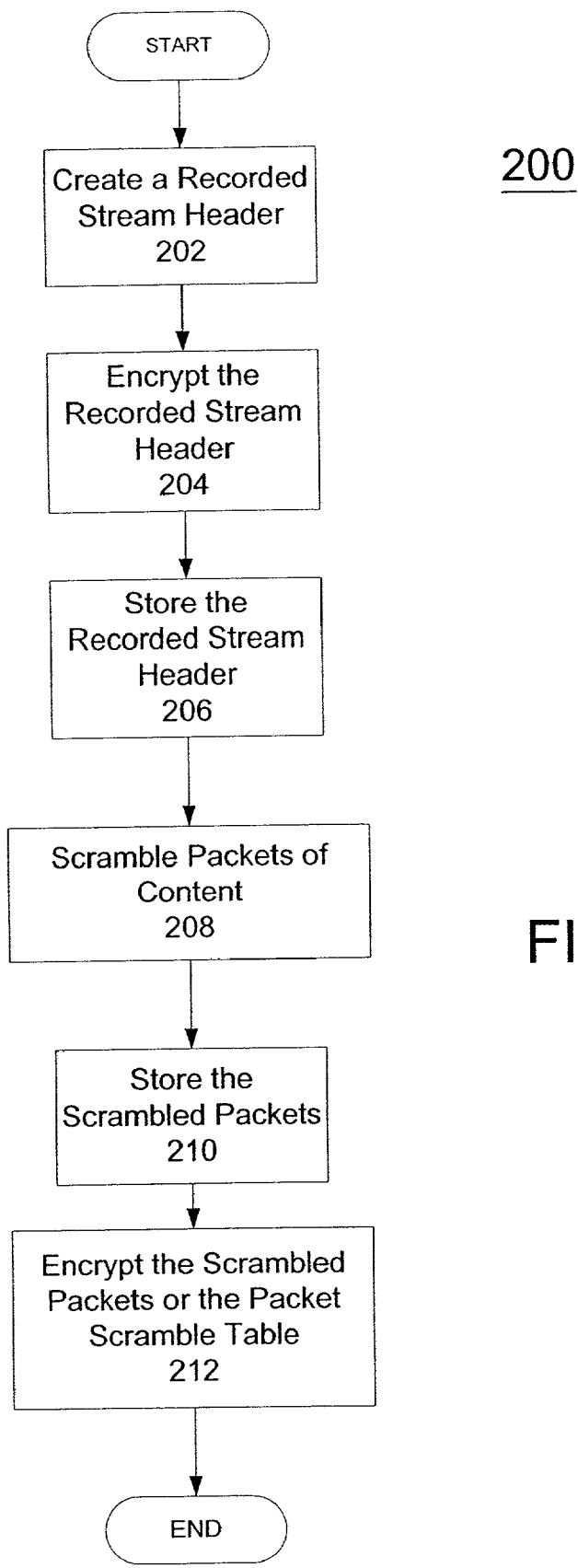
FIG. 6A is a flowchart illustrating an exemplary method of digital rights management.
Figure 6B:
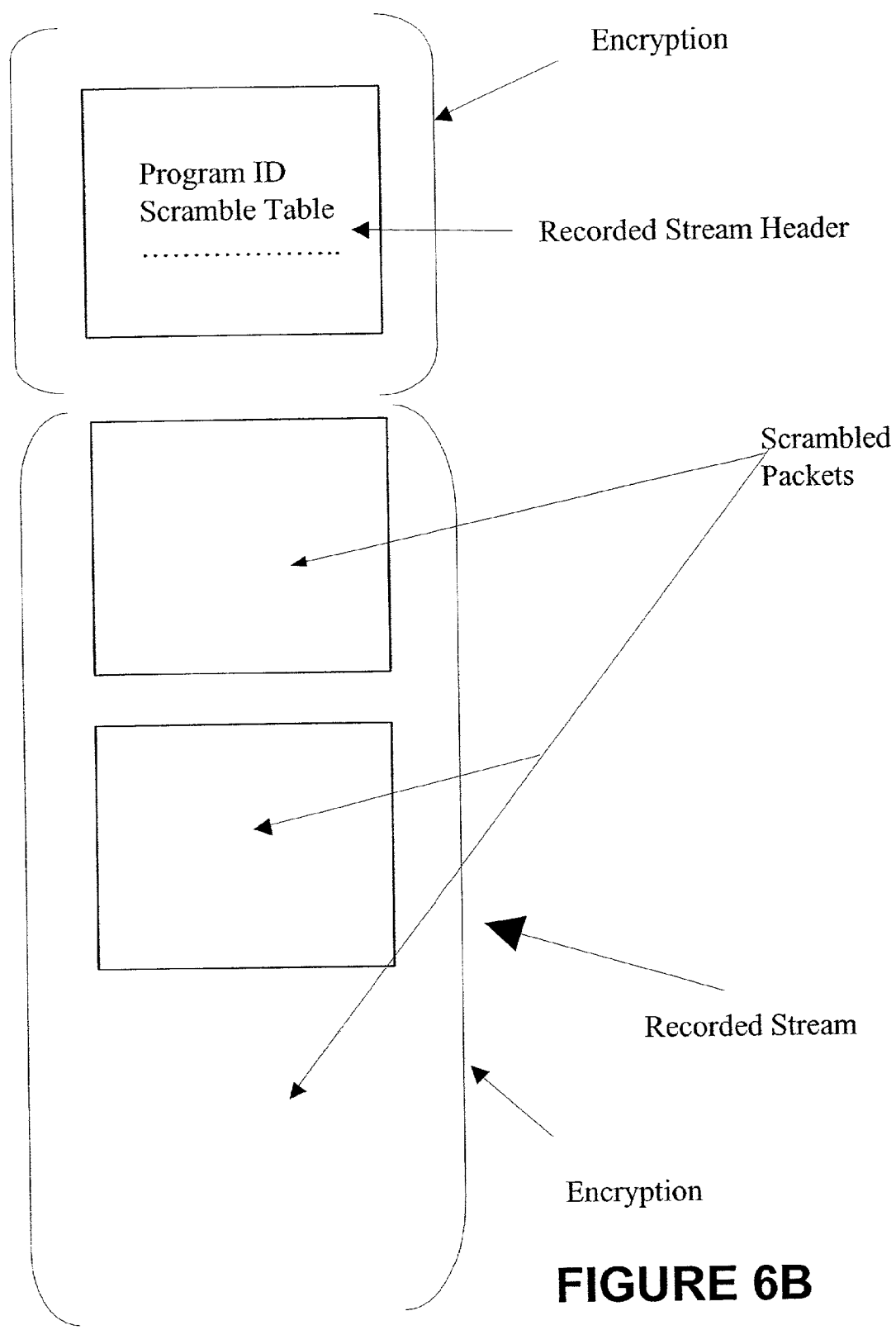
FIG. 6B is a block diagram illustrating an exemplary recorded stream of content.

When content is recorded and stored in the client's local cache (e.g., on the secondary storage device 50 of the user machine 40), another portion of the digital rights management takes place, as shown in FIG. 6A. FIG. 6A illustrates a method 200 of digital rights management for recorded content. Method 200 may be implemented, for example, with software modules for execution by processor 46, processor 64, or a combination of the two processors. The method 200 comprises the steps of: creating a recorded stream header 202, encrypting the recorded stream header 204, storing the recorded stream header 206, scrambling packets of the content 208, storing the scrambled packets 210, and encrypting the scrambled packets or the packet scramble table 212. When a client records content, additional security is built into the recorded stream. A recorded stream header 214, as shown in FIG. 6*b*, is created 202 and stored at the client 12 (e.g., on the secondary storage device 50) with the related digital data packets 214 of the recorded content. The recorded stream header is encrypted 204 with 128-bit encryption using the static application key (the DRM module 45 preferably includes static application key necessary for decrypting the recorded stream header 214). The recorded stream header 214 includes the program ID of the recording content and a packet scramble table. Accordingly, the stream of packets may be scrambled if the packets are recorded or stored. For example, the contents of each individual packet may be scrambled using a mathematical "XOR" operation or other similar process such as that utilizing a lookup table. The recorded stream header must be first decrypted and the packet scramble table read in order to determine the proper order of the packet contents. The inherent security in scrambling the packets is enhanced by using different scrambling for each instance of recording content. The scrambled packets or the packet scramble table are encrypted 212 with the symmetric key from the content's digital certificate.

When a client attempts to display the recorded content, the client software 43 (e.g., the DRM module 45) decrypts the recorded stream header and attempts to retrieve the symmetric key as shown above in FIGS. 5A–5D. If the symmetric key is successfully retrieved the client 18 decrypts the scrambled packets or the packet scramble table and then de-scrambles the recorded stream of packets. Once the recorded stream of packets is de-scrambled, they may be displayed as streaming video on the user machine display.

Note that the hardware profile will not match the user machine 40 of client 18 if the user has made an unauthorized transfer of the client software 43. Normally, the present invention supports the user's migration from one user machine to another. This allows the user to upgrade the user machine 40 in order to take advantage of better technology. However, for example, the user may have copied the client software 43, including the certificate store, onto a second user machine while the client software 43 is still resident on a first user machine, without registering or otherwise receiving authorization from the system. In this situation, the digital certificate on the DRM server 58 would retain the hardware profile of the first user machine 40, thereby preventing unauthorized viewing of content on the second user machine.

For recorded content, a packet scramble table, or other additional encryption information for the recorded content, may be placed in the header of each recorded packet instead of the recorded stream header. For example, the recorded content packets may be encrypted with 128-bit encryption and the content data in each recorded packet may be scrambled. When the recorded content is displayed, the recorded content packets are decrypted and the packet scramble table in each header is used to de-scramble the content data in each recorded packet. Alternatively, a subset of the recorded content packets may include a packet scramble table in their headers.

The digital rights management described above includes the encryption of every packet of a particular piece of content. Alternatively, other encryption method may be used, such as encrypting every other packet or some other combination of packets. Likewise, the multicast stream utilizes forward error correction with redundant information every fifteenth ($15^{th}$) packet. Alternatively, other error correction may be user and the redundant information may be spaced at different intervals.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. Those skilled in the art will recognize that these and other variations are possible within the spirit and scope of the invention as defined in the following claims and their equivalents.

What is claimed is:

1. A method of digital rights management (DRM), comprising the steps of:
   receiving content at a client computer, wherein the content is encrypted with an encryption key;
   the client computer requesting the encryption key from a server using a digital certificate, wherein the digital certificate includes a public key of a public key infrastructure (PKI) key pair, the server is remote from the client computer and a first hardware profile of the client computer is stored and linked with a copy of the digital certificate on the server, and the requesting step includes transmitting a second hardware profile of the client computer to the server;
   the server receiving the request;
   determining if the digital certificate is valid, wherein the determining step determines whether the second hardware profile is the same as the first hardware profile;
   encrypting the second hardware profile of the client computer with a random session key; and
   encrypting the random session key with the public key of the PKI key pair.

2. The method of claim 1, wherein if the digital certificate is valid the method further comprises the steps of:
   transmitting the encryption key to the client computer; and
   the client computer decrypting the content with the encryption key.

3. The method of claim 2, further comprising the steps of:
   encrypting the encryption key, wherein:
   the transmitting step transmits the encrypted encryption key to the client computer; and
   the client computer decrypting the encrypted encryption key.

4. The method of claim 3, further comprising the step of:
   determining a hardware profile of the client computer, wherein:
   the encrypting step encrypts the encryption key with the hardware profile of the client computer.

5. The method of claim 4, wherein:
   the hardware profile of the client computer is stored and linked with a copy of the digital certificate on the server; and
   the determining step retrieves the hardware profile that is linked with the copy of the digital certificate.

6. The method of claim 2, wherein encryption key is only stored in volatile memory of the client computer.

7. The method of claim 1, wherein:
   a copy of the digital certificate including a private key of the PKI key pair is stored on the server; and
   the determining step includes decrypting the random session key with the private key of the PKI key pair.

8. The method of claim 1, wherein:
   the digital certificate includes a certificate serial number;
   a copy of the digital certificate that includes the certificate serial number is stored on the server;
   the requesting step includes transmitting the certificate serial number to the server; and
   the determining step includes retrieving the copy of the digital certificate using the certificate serial number.

9. The method of claim 1, wherein the receiving step receives content from a website server.

10. The method of claim 1, wherein the server is a first server and the receiving step receives content from a second server co-located with the first server.

11. A system for digital rights management comprising:
    a digital rights management (DRM) server; and
    a client computer, wherein the client computer includes software comprising instructions for:
    receiving content, wherein the content is encrypted with an encryption key; and
    requesting the encryption key from the DRM server using a digital certificate, wherein the digital certificate includes a public key of a public key infrastructure (PKI) key pair and the DRM server is remote from the client computer; and
    wherein the DRM server includes software comprising instructions for:
    receiving the request; and
    determining if the digital certificate is valid; and
    wherein the server further includes a first hardware profile of the client computer stored and linked with a copy of the digital certificate, the requesting instruction includes transmitting a second hardware profile of the client computer to the server, the determining instruction determines whether the second hardware profile is the same as the first hardware profile and the client computer software further comprises instructions for:
encrypting the second hardware profile of the client computer with a random session key; and
encrypting the random session key with the public key of the PKI key pair.

12. The system of claim 11, wherein the server software further comprises instructions for:
if the digital certificate is valid, transmitting the encryption key to the client computer.

13. The system of claim 12, wherein the client computer software further comprises instructions for:
decrypting the content with the encryption key.

14. The system of claim 11, wherein the server software further comprises instructions for:
encrypting the encryption key, wherein the transmitting instruction transmits the encrypted encryption key to the client computer.

15. The system of claim 14, wherein the server software further comprises instructions for:
determining a hardware profile of the client computer, wherein the encrypting instruction encrypts the encryption key with the hardware profile of the client computer.

16. The system of claim 14, wherein the hardware profile of the client computer is stored and linked with a copy of the digital certificate on the server and the determining instruction retrieves the hardware profile that is linked with the copy of the digital certificate.

17. The system of claim 11, wherein the server includes a copy of the digital certificate including a private key of the PKI key pair and the determining instruction includes decrypting the random session key with the private key of the PKI key pair.

18. The system of claim 11, wherein:
the digital certificate includes a certificate serial number;
the server includes a copy of the digital certificate including the certificate serial number;
the requesting instruction includes transmitting the certificate serial number to the server; and
the determining instruction includes retrieving the copy of the digital certificate using the certificate serial number.

19. The system of claim 11, wherein the receiving instruction receives content from a website server.

20. The system of claim 11, wherein the server is a first server and the receiving instruction receives content from a second server co-located with the first server.

21. A computer-readable medium comprising instructions for digital rights management, by:
receiving content at a client computer, wherein the content is encrypted with an encryption key; and
requesting the encryption key from a digital rights management (DRM) server using a digital certificate, wherein the digital certificate includes a public key of a public key infrastructure (PKI) key pair and wherein:
the server is remote from the client computer;
the server receives the request;
the server determines if the digital certificate is valid;
a first hardware profile of the client computer is stored on the server; and
the requesting instruction includes transmitting a second hardware profile of the client computer to the server, wherein the DRM determines if the digital certificate is valid by comparing the second hardware profile of the client computer to the first hardware profile of the client computer, the computer readable medium further comprising instructions for:
encrypting the second hardware profile of the client computer with a random session key; and
encrypting the random session key with the public key of the PKI key pair.

22. The computer-readable medium of claim 21, further comprising instructions for:
receiving the encryption key from the server, wherein the encryption key is encrypted; and
decrypting the encryption key.

23. The computer-readable medium of claim 22, wherein:
the encryption key is encrypted with a hardware profile of the client computer; and
the decrypting instruction decrypts the encryption key with the hardware profile of the client computer.

24. The computer-readable medium of claim 21 wherein:
the digital certificate includes a certificate serial number;
the server includes a copy of the digital certificate including the certificate serial number;
the requesting instruction includes transmitting the certificate serial number to the server; and
the DRM determines if the digital certificate is valid by retrieving the copy of the digital certificate using the certificate serial number.

25. The computer-readable medium of claim 21 wherein the receiving instruction receives content from a website server.

26. The computer-readable medium of claim 21 wherein the server is a first server and the receiving instruction receives content from a second server co-located with the first server.

* * * * *

UNITED STATES PATENT AND TRADEMARK OFFICE
CERTIFICATE OF CORRECTION

PATENT NO. : 7,036,011 B2  Page 1 of 1
APPLICATION NO. : 09/893635
DATED : April 25, 2006
INVENTOR(S) : Tom Grimes et al.

It is certified that error appears in the above-identified patent and that said Letters Patent is hereby corrected as shown below:

On the title page, item "(73) Assignee:" delete "CacheStream Corporation, Newtown, PA (US)".

Signed and Sealed this
Twenty-first Day of April, 2015

Michelle K. Lee
*Director of the United States Patent and Trademark Office*